United States Patent [19]

Hergert et al.

[11] Patent Number: 5,792,322

[45] Date of Patent: Aug. 11, 1998

[54] FLOW SPLITTING DEVICE FOR WEB PROFILE CONTROL STOCK DILUTION SYSTEM

[75] Inventors: Richard E. Hergert, Rockton; Thomas D. Rogers, Roscoe; Alfred C. Li, Naperville; Eugene E. Neill, So. Beloit, all of Ill.; Frank J. Wywialowski, Beloit, Wis.

[73] Assignee: Beloit Technologies, Inc., Wilmington, Del.

[21] Appl. No.: 761,183

[22] Filed: Dec. 3, 1996

[51] Int. Cl.[6] ............................................. D21F 1/08
[52] U.S. Cl. ......................... 162/258; 162/259; 162/336
[58] Field of Search .............................. 162/258, 259, 162/343, 336, 339, 344

[56] References Cited

U.S. PATENT DOCUMENTS 5,196,091  3/1993  Hergert ............................ 162/258
5,560,807  10/1996  Hauser ............................ 162/183

OTHER PUBLICATIONS

"*ExtrudeHone*" brochure, ExtrudeHone Corporation, 8075 Pennsylvania Avenue, Irwin, PA 15642.

*Primary Examiner*—Stanley S. Silverman
*Assistant Examiner*—Jose A. Fortuna
*Attorney, Agent, or Firm*—Lathrop & Clark

[57] ABSTRACT

A Y-shaped flow splitter passes papermaking fluid with some fibers with reduced clogging and has a flat surface opposite the leg of the Y where the flow divides into the two arms of the Y. A generally flat rectangular surface is positioned opposite the leg of the Y of the flow splitter which divides the flow evenly without providing a place for fibers to collect and thus clog the flow through the splitter. The splitter allows the flow to a pair of dilution tubes to be controlled by a single valve with a single flow passage reducing clogging and valve cost. The flow splitter is constructed of stainless steel by a by casting process. A process known commercially as the Extrudehone process is used to produce smooth flow passages.

6 Claims, 4 Drawing Sheets

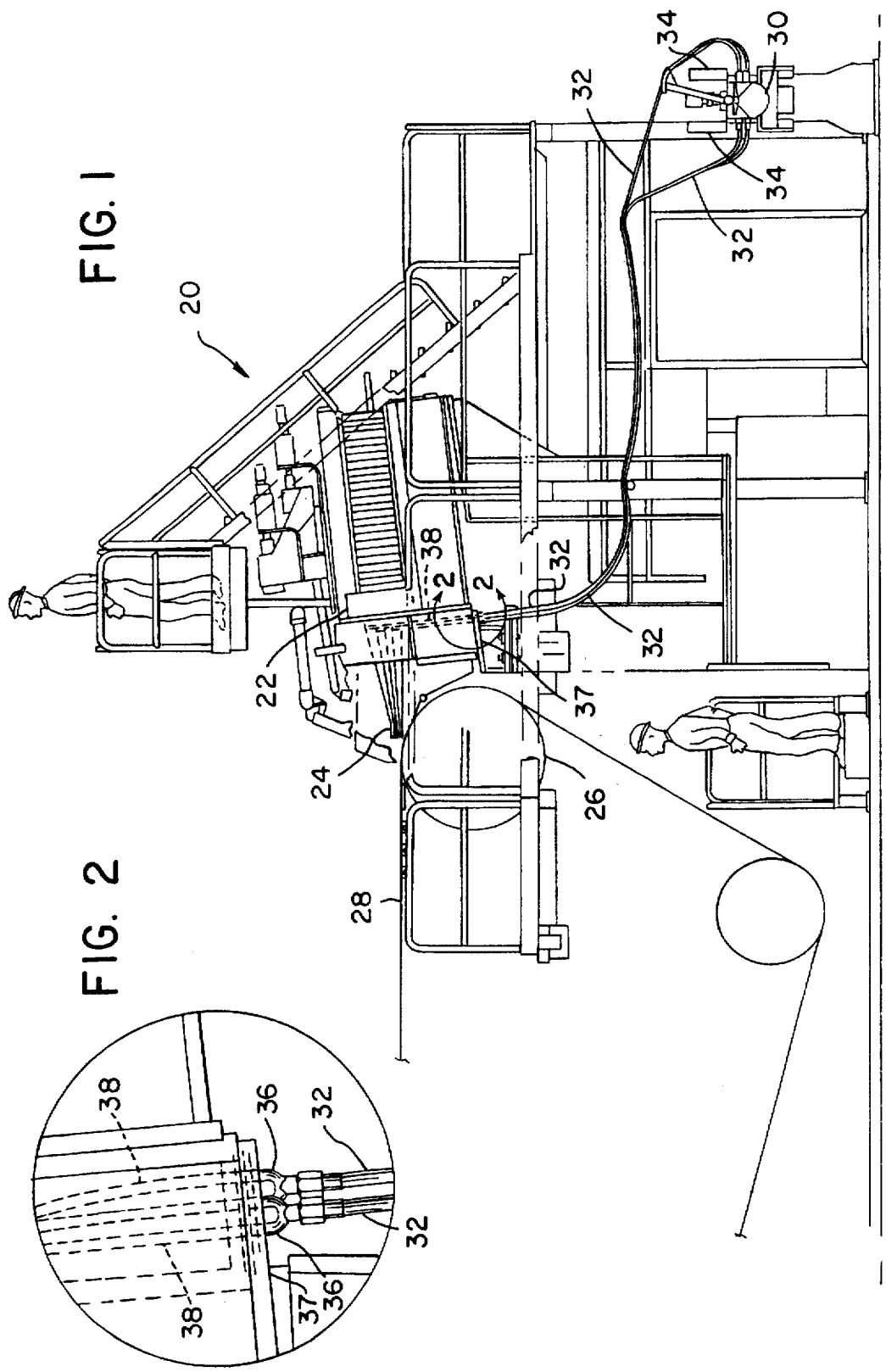

FLOW SPLITTING DEVICE FOR WEB PROFILE CONTROL STOCK DILUTION SYSTEM

FIELD OF THE INVENTION

The present invention relates to devices for controlling the flow of stock to a headbox in general and in particular to a headbox employing stock dilution for controlling web base weight profile.

BACKGROUND OF THE INVENTION

Paper is manufactured on a papermaking machine which starts with a water based stock containing about one-half of one percent paper fibers by weight. The stock is supplied from a headbox which has a slice opening which injects a stream of stock onto a forming wire or screen. A modern papermaking machine may form a sheet of paper four hundred inches wide. In the past the thickness of the paper being formed has been controlled by bending the slice opening to adjust the amount of stock at a particular location in the paper web being formed. Uniformity in the paper as formed is important for reliable function of many modern high speed printing and photocopying processes. A more uniform sheet of paper also conserves resources by reducing the required weight of fibers needed to form a web of a given minimum thickness.

U.S. Pat. No. 5,196,091 to Hergert and assigned to Beloit Technologies, Inc. discloses a new kind of headbox which employs stock dilution to control the thickness of the paper web being formed, and is incorporated herein by reference. The system disclosed by Hergert has proved highly effective at controlling the base weight profile of a web of paper. The system disclosed by Hergert utilizes a multiplicity of individual tubes which supply white water to the headbox to selectively dilute the consistency of the stock supplied to the slice opening. The tubes are grouped together in pairs along the width of the headbox in the cross machine direction. Each tube is supplied from a white water manifold by a flexible hose. Each group of two supply lines or hoses is controlled by a double ball valve arrangement which controls the flow of dilution water to both tubes of a grouping of tubes.

What is needed is a means for reducing the number and complexity of the valves used to control the flow of dilution water to a headbox which employs dilution water for profile control.

SUMMARY OF THE INVENTION

The invention consists of a Y-shaped flow splitter designed to pass fiber-containing water without clogging. The flow splitter has a flat surface opposite the leg of the Y where the flow divides into the two arms of the Y. A conventional flow splitter such as used with a garden hose has a relatively sharp wedge opposite the leg of the Y. The conventional wedge literally cuts the flow into two even parts. However in modern papermaking, discharge of water to the environment is reduced or eliminated by reusing processed water as often as possible. Thus white water, which is water which has passed through the headbox and through the forming wire but which still contains significant fiber content is used for dilution in the headbox. A sharp flow splitting wedge has a tendency to staple or collect fibers. Although individual fibers are very short they can still form threads which become hung-up on the edge of a sharp wedge which splits two flows. The flow splitter of this invention has a generally flat rectangular surface opposite the legs of the Y. This rectangular surface divides the flow evenly without providing a place for fibers to collect and thus clog the flow through the splitter. A splitter which is operable with fiber-containing fluids allows the flow to a pair of dilution tubes to be controlled by a single valve with a single flow passage which is less subject to collecting fibers and thus becoming clogged. Larger simpler valves are less costly, while at the same time the valves and the supply lines to the valves are less subject to clogging.

The flow splitter of this invention is constructed of stainless steel by an investment casting process. Stainless steel provides the needed resistance to long term exposure to chemicals in the dilution water. Although die casting provides a cost effective means of forming the complicated geometry of the flow splitter it cannot provide the required smoothness of the flow channels. Hand burnishing of the flow channels is not cost effective. A relatively new process, known by the trade name Extrudehone, uses abrasives contained in a highly viscous fluid which is repeatedly passed through the flow passages to produce smooth flow passages.

It is a feature of the present invention to provide a headbox which provides web profile control at lower cost.

It is another feature of the present invention to provide a flow splitter suitable for use with a fluid containing fibers.

It is a further feature of the present invention to provide a method of cost effective manufacturing of a flow splitter for use in supply dilution water to a headbox.

It is yet another feature of the present invention to provide a headbox profile control dilution system which is less subject to clogging. Further objects, features and advantages of the invention will be apparent from the following detailed description when taken in conjunction with the accompanying drawings.

BRIEF DESCRIPTION OF THE DRAWINGS

FIG. 1 is a side elevational schematic view of the wet end of a papermaking machine showing the position of the flow splitter of this invention with respect to the headbox in a papermaking machine.

FIG. 2 is an enlarged fragmentary view of the detail 2—2 of FIG. 1 depicting the location of the flow splitter of this invention.

DESCRIPTION OF THE PREFERRED EMBODIMENT

Figure 3:
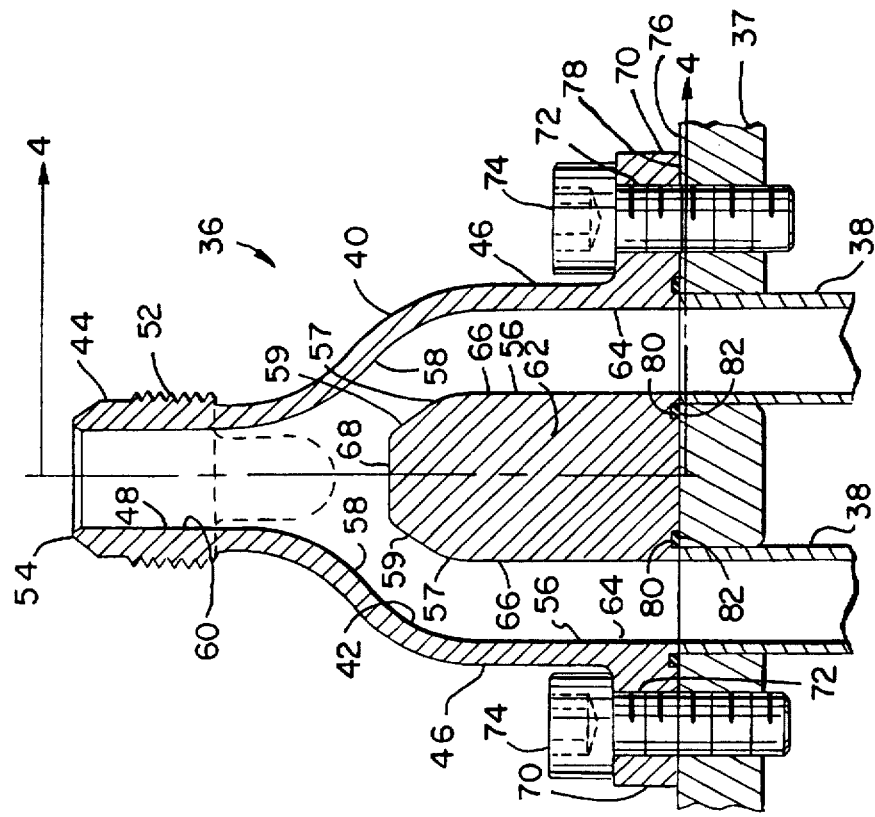
FIG. 3 is a front elevational cross-sectional view of the flow splitter of FIG. 1 shown attached to the headbox.

Referring more particularly to FIGS. 1-7 wherein like numbers refer to similar parts the wet end 20 of a papermaking machine is shown in FIG. 1. The wet end 20 includes a headbox 22 which injects a stream of stock through a slice 24 onto a breast roll 26. A forming wire or cloth 28 runs over the breast roll and the stock of the headbox 22 forms a web of paper on the wire 28. Also shown in FIG. 1 is a consistency profiling header 30 which supplies white water to hoses 32. The hoses 32 are connected to the consistency profiling header 30 by valves 34 which control the flow of white water through the hoses 32. Each hose 32 is in turn connected to a flow splitter 36, shown in FIG. 2. The flow splitters 36 are mounted as shown in FIGS. 2 and 3 on a support flange 37 mounted to the headbox 22. Each flow splitter 36 is connected to two dilution control conduits 38 which supply dilution water to the headbox 22. Each control conduit 38 in a pair which is fed from a single splitter 36 terminates at the same cross machine position, so that one conduit of the pair is positioned above the other conduit of the pair. Thus both conduits 38 affect the thickness of the web in the same cross-machine location and thus can be controlled from a single valve 34. Two conduits 38 are used to effect a more even dilution of the stock flow at a particular cross machine direction position.

Pairs of conduits 38 are spaced in the cross machine direction on centers of 1.4 inches to about 1.6 inches. Thus, for a papermaking machine that is 400 inches wide, 250 to 285 pairs of conduits may be required. If a control valve for each conduit is used then an additional 250 to 285 control valves are needed. Existing devices employ control valves with dual actuated ball valves. Valves with dual fluid channels are more expensive than valves with single fluid channels. In addition higher flow rates through the valves 34 and the hoses 32 make clogging of the valves and hoses much less likely.

Figure 5:
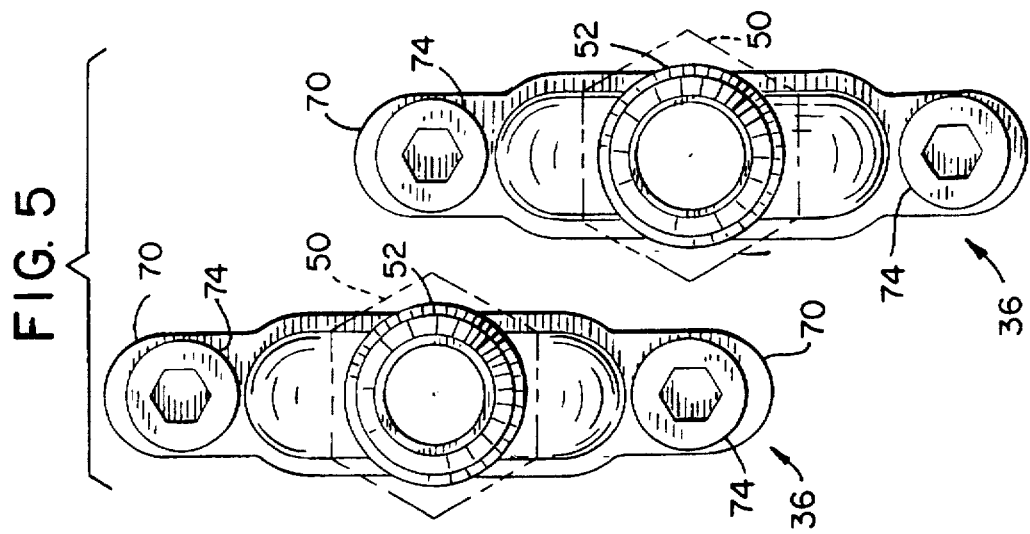
FIG. 5 is a top plan view of the two flow splitters of FIG. 1 showing the flow splitters offset for installation clearance.
Figure 4:
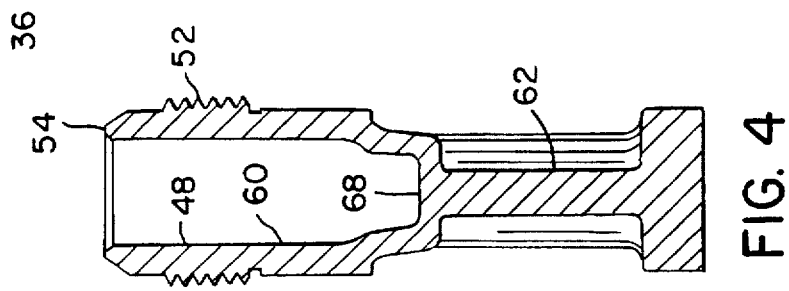
FIG. 4 is a cross-sectional view of the flow splitter of FIG. 3 taken along section line 4—4.

The flow splitter 36, shown in FIGS. 3–5, is of unitary construction and is manufactured as a stainless steel casting. The flow splitter has an overall Y-shaped body 40 which defines a Y-shaped flow passage 42 as seen in FIG. 3. Fluid enters the single leg 44 and is split into two arms 46. The leg 44 defines a flow passage 48 which is connected to a hose 32, shown in FIG. 2, by a female nut 50, shown in FIG. 5, which engages male threads 52. The male threads 52 surround the lip 54 which leads into the flow passage 48. The arms 46 define parallel flow passages 56 which are parallel to the leg flow passage 48. Transition flow channels 57 connect the parallel flow passages 56 to the leg flow passage 48. The arms 46 have smooth curved transition sections 58 which are contiguous with the wall 60 of the leg flow passage 48 and the outside walls 64 of the parallel arm flow passages 56. A portion 62 of the body 40 joins the inside walls 66 of the parallel flow passages 56. The body portion 62 defines a planar surface 68 which terminates or opposes the leg flow channel 48. The planar surface 68 is substantially rectangular and divides the flow from the leg flow passage 48 into two substantially equal flows into the arm flow passages 56.

The arms 46 join at an angle of about eighty degrees where the transition sections 58 meet to form the flow passage 48 of the leg 44. Surfaces 59 formed on the body portion 62 and abutting the planar surface 68 form an eighty degree angle with respect to each other. An exemplary flow splitter 36 as shown in FIGS. 3–5 is 3.55 inches high and has an inlet diameter of 0.615 inches and outlet diameters of 0.490 inches. The distance from the lip 54 to the planar surface 68 is 1.89 inches.

The flow splitter 36 has a base flange 70 which abuts the support flange 37 on the headbox 22. The base flange 70 has a hole 72 on either side of the two arms 46. Hex headed bolts 74 attach the flange 70 to the support flange 37. The control conduits 38 terminate at the surface 76 of the support flange 37. The arm flow passages 56 join the control conduits 38 at the surface 76 of the flange 37. The bottom surface 78 of the base flange 70 mates against the surface 76 of the support flange 37. O-Ring grooves 80 and O-Rings 82 seal the junction between the flow splitter 36 and the headbox support flange 37.

Tests were performed to evaluate the flow splitter 36 on commercial silo water that was known to have a considerable amount of long fiber and had not been usable as dilution water in consistency profiling. Water was drawn from the commercial silo containing stock with a consistency of 0.280 percent fiber and supplied at 20 psi to an inlet manifold to which were connected single port supply valves which connected to ¾ inch hoses 36 inches long which connected to four flow splitters 36. The output of the flow splitters was connected to ½ inch hoses which led into a discharge manifold which was maintained at 10 psi. A dual port valve was also connected between the input manifold and the output manifold which connected to ½ inch hoses of 42 inch length. Flow splitters were run with flow rates of 1, 3.5 and 7 gallons per minute per arm. The dual port valve was set at flow rates 1 gallon per minute per port.

The results were, that during five day tests the single port valves ahead of the flow splitters ran clean with very little fines buildup. The dual valve top port plugged completely during the 5 day test although it ran fairly cleanly during the one day test. The results showed much improvement with valve cleanliness. On the second day of the 5 day test the 3.5 gallons-per-minute flow splitter caught a string of fibers that stapled across the flat surface 68. On the fourth day, in one of the two 1-gallon per minute flow splitters a string stapled across the flat 68 of the flow splitter. The flow splitters never clogged and only built up to a point after which the build-up did not increase. The strings of fibers were not well attached, and flushed out freely at shutdown. The other two flow splitters ran clean during the entire trial.

Figure 7:
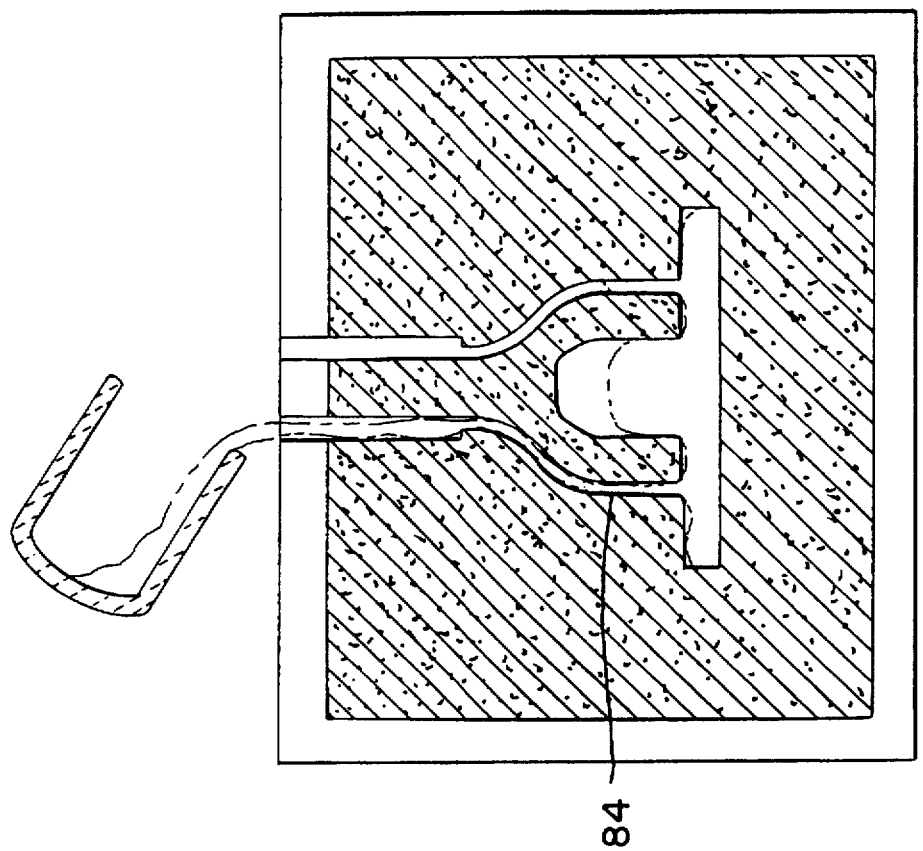
FIG. 7 is an illustrative view of the Extrudehone process.

The flow splitter 36 is fabricated as a stainless steel investment casting 84 as illustrated in FIG. 7. In such a process a mold cavity is formed which defines the structure of the splitter, including the various flow passages therethrough. Molten metal is then introduced into the cavity so formed and allowed to cool, yielding a cast part. Casting is a cost effective method of fabricating a part with complex geometry. The molten steel is preferably selected to be stainless steel because of its resistance to corrosion. Corrosion resistance is desirable for the flow splitter 36 due to the presence of small amounts of chemicals in the dilution water which will pass through the splitter flow passages.

Figure 6:
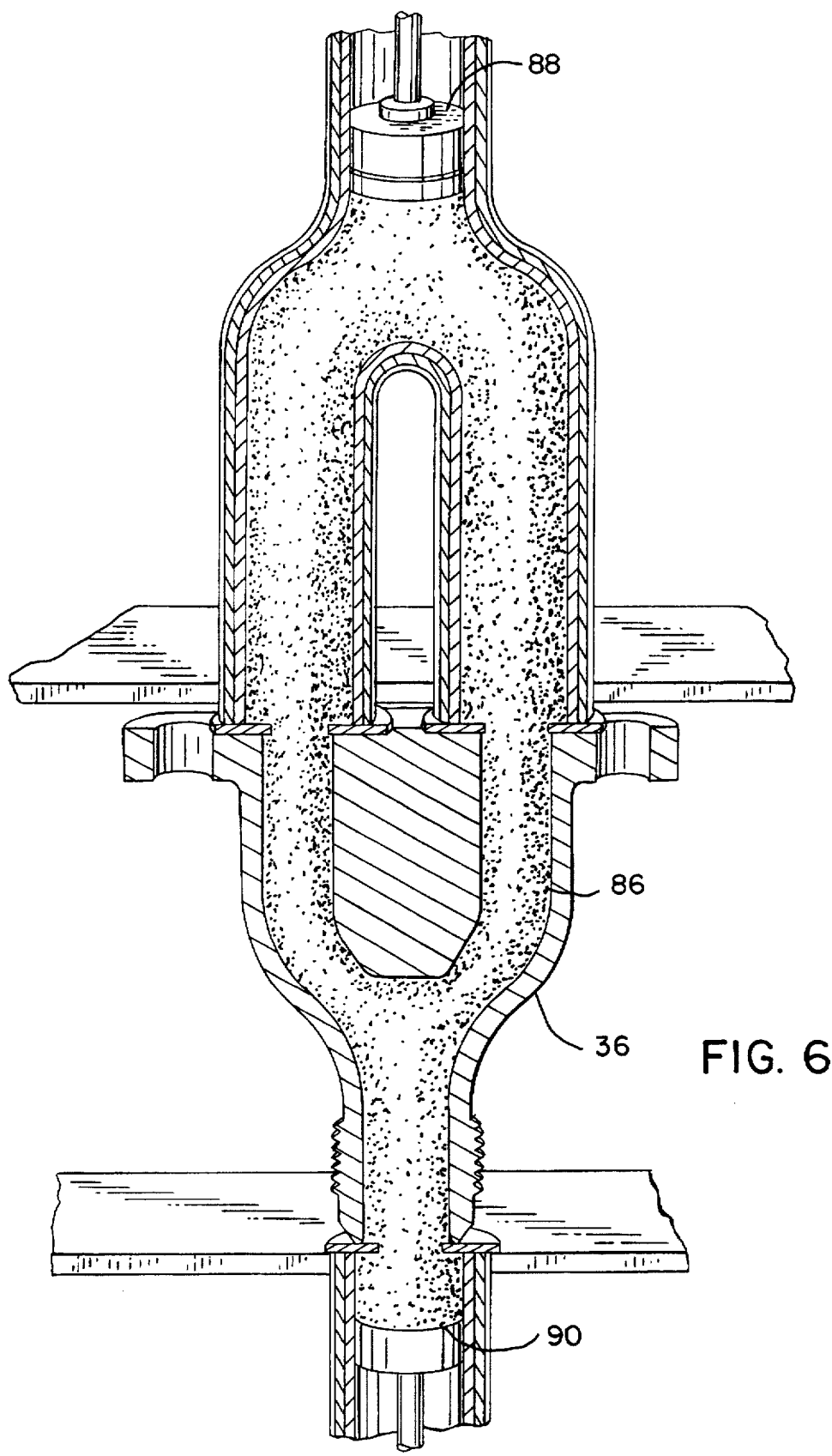
FIG. 6 is an illustrative view of the die casting process whereby the flow splitter of FIG. 1 is formed.

Although a casting is a cost-effective means of producing the required shape it can be difficult and costly to achieve the required surface finish required to avoid fibers adhering to the inside surfaces 48, 56, 59 of the flow passage 42. To achieve the desired finish, a unique honing process, as shown in FIG. 6, is employed. This process uses an abrasive suspension and a highly viscous fluid 86 to form a smooth finish. The process is known commercially as the Extrudehone process and is available from the EXTRUDEHONE Corporation located at 8075 Pennsylvania Avenue, Irwin, Pa. 15642. Opposed pistons 88 and 90 cause repeated passage of the highly viscous fluid 86 through the flow splitter 36, thereby honing and polishing the flow passageway.

It should be understood that wherein a single wire former is shown at the wet end 20 of FIG. 1 a twin wire former could be used.

It is understood that the invention is not limited to the particular construction and arrangement of parts herein illustrated and described, but embraces such modified forms thereof as come within the scope of the following claims.

We claim:

1. A papermaking machine wet end comprising:

at least one forming wire;

a slice positioned adjacent the forming wire for ejecting a stream of stock into engagement with the forming wire to form a web of fibers;

a headbox connected to the slice for supplying stock to the slice, the headbox having a multiplicity of control conduits arrayed in a cross machine direction for supplying fluid to the headbox;

a profiling header providing a source of profile controlling fluid;

a plurality of control valves connected to the profiling header;

a plurality of hoses, wherein each control valve has one of said plurality of hoses connected thereto;

a plurality of flow splitters, wherein each flow splitter is connected between one hose and two control conduits positioned at the same cross machine position, wherein each flow splitter comprises:

a body formed of a cast alloy, the body having a leg which divides into a first arm and a second arm, the body defining a substantially Y-shaped flow passage;

wherein the first arm and the second arm have portions which define spaced parallel flow channels and wherein the leg has portions which define a single channel parallel to the arm channels;

portions of the first arm which define a smooth curved flow channel section connecting the leg flow channel to the first arm flow channel;

portions of the first arm which define a first transition section which is continuous with the flow channel of the leg;

portions of the second arm which define a smooth curved flow channel section connecting the leg flow channel to the second arm flow channel;

portions of the second arm which define a second transition section which is continuous with the flow channel of the leg; and a portion of the body joining the first transition section and the second transition section and forming a planar surface terminating the flow channel of the leg and disposed substantially perpendicular to the leg flow channel.

2. The flow splitter of claim 1 wherein each arm flow channel has an outlet end, and further comprising a mounting flange integrally formed with the body and surrounding the arm flow channel outlet ends.

3. The flow splitter of claim 2 wherein the mounting flange has portions define a groove which surrounds the arm flow channel outlet ends for reception of a sealing means therein.

4. The flow splitter of claim 1 wherein the leg has an opening opposite the arms and wherein portions of the leg define a thread surrounding the opening.

5. A papermaking machine wet end comprising:

a forming wire;

a slice positioned over the forming wire for ejecting a stream of stock onto the forming wire to form a web of fibers;

a headbox connected to the slice for supplying stock to the slice, the headbox having a multiplicity of control conduits arrayed at selected positions in the cross machine direction for supplying fluid to the headbox;

a profiling header providing a source of profile controlling fluid;

a plurality of control valves connected to the profiling header;

a plurality of hoses, wherein a hose is connected to each control valve;

a plurality of flow splitters, wherein each flow splitter is connected between one hose, and two control conduits, and wherein each flow splitter comprises a body having a substantially Y-shaped flow passage, the Y-shaped flow passage having a leg channel which divides into a first arm channel and a second arm channel, the first arm channel having a curved flow channel section connecting the first arm flow channel to the leg flow channel, and wherein the first arm channel has a first transition section which is continuous with the flow channel of the leg, and wherein the second arm channel has a curved flow channel section which connects the second arm flow channel to the leg flow channel, and wherein the second arm channel has a second transition section which is continuous with the flow channel of the leg, and wherein a portion of the body joins the first transition section and the second transition section, said portion of the body forming a substantially planar surface which terminates the leg flow channel and which is disposed substantially perpendicular to the leg flow channel.

6. A papermaking machine wet end comprising:

at least one forming wire;

a slice positioned adjacent the forming wire for ejecting a stream of stock into engagement with the forming wire to form a web of fibers;

a headbox connected to the slice for supplying stock to the slice, the headbox having a multiplicity of first control conduits arrayed in cross machine positions for supplying fluid to the headbox, wherein each first control conduit is associated with a second control conduit supplying fluid to the headbox, the second control conduit being positioned at substantially the same cross machine position as the first control conduit;

a profiling header providing a source of profile controlling fluid;

a plurality of control valves mounted to the profiling header;

a plurality of hoses one of which connects to each of the control valves;

a plurality of flow splitters, wherein each flow splitter is connected between one hose and a first control conduit and a second control conduit, and wherein each flow splitter has;

a body, the body having a substantially Y-shaped flow passage, and the body having a leg which divides into a first arm and a second arm, wherein the first arm and the second arm define spaced parallel flow channels and wherein the leg defines a single channel parallel to the arm channels;

the first arm having a smooth curved flow channel section connecting the first arm flow channel to the leg flow channel;

the first arm having a first transition section which is continuous with the flow channel of the leg;

the second arm having a smooth curved flow channel section connecting the second arm flow channel to the leg flow channel;

the second arm having a second transition section which is continuous with the flow channel of the leg; and a portion of the body joining the first transition section and the second transition section and forming a planar surface terminating the flow channel of the leg and disposed substantially perpendicular to the leg flow channel.

* * * * *